United States Patent [19]

Herbener

[11] 3,744,617

[45] July 10, 1973

[54] THERMOFORMING APPARATUS
[75] Inventor: Albert Herbener, Akron, Ohio
[73] Assignee: NRM Corporation, Akron, Ohio
[22] Filed: Aug. 3, 1970
[21] Appl. No.: 67,660

Related U.S. Application Data
[62] Division of Ser. No. 820,098, April 29, 1969, Pat. No. 3,632,272.

[52] U.S. Cl. .............................................. 198/135
[51] Int. Cl. .......................................... B65g 15/00
[58] Field of Search ................ 198/19, 135; 74/110

[56] References Cited
UNITED STATES PATENTS
3,183,533  5/1965  Kull .............................. 198/135 X
2,143,117  1/1939  Todd .................................... 198/19
3,386,224  6/1968  Shottleworth ................. 198/135 X
2,313,814  5/1943  Eisler .................................. 198/135

Primary Examiner—Richard E. Aegerter
Assistant Examiner—Douglas D. Watts
Attorney—Oberlin, Maky, Donnelly & Renner

[57] ABSTRACT

Thermoforming apparatus including an oven, a thermoformer adjacent to the oven, and a sheet conveyor operative to successively index a plastic sheet gripped thereby into the oven for heating of the sheet to forming temperature and from the oven into the thermoformer whereat the heated sheet is formed in a mold in the thermoformer, the conveyor being driven by 180° rotation of a drive crank to achieve a sinusoidal speed curve for gradual acceleration of the conveyor and sheet from zero speed and gradual deceleration of the conveyor and sheet to zero speed in the stepwise transport of the sheet into and from the oven and into and from the thermoformer.

4 Claims, 5 Drawing Figures

THERMOFORMING APPARATUS

This is a division of application Ser. No. 820,098, filed Apr. 29, 1969, now U.S. Pat. No. 3,632,272.

SUMMARY OF THE INVENTION

It is a principal object of this invention is to provide a thermoformer wherein the sheet conveyor has a sinusoidal speed curve to provide for smooth acceleration and deceleration of the stepwise advance of a plastic sheet through the oven and thermoformer to minimize vibration and shock loads in the apparatus.

Other objects and advantages of the present invention will become apparent as the following description proceeds.

DISCUSSION OF THE INVENTION

Figure 1:
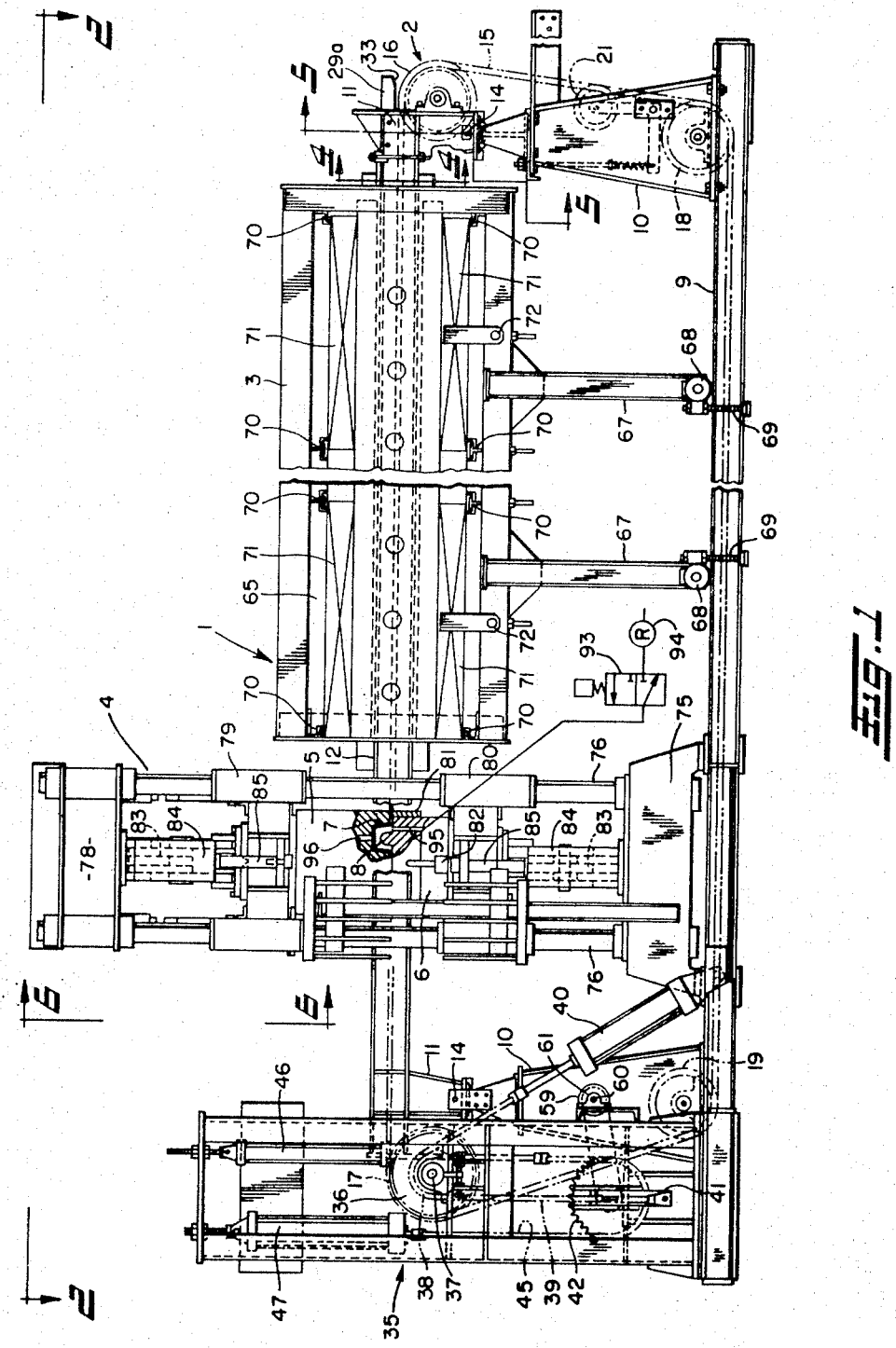
FIG. 1 is a side elevation view of a preferred form of thermoforming apparatus embodying the present invention.
Figure 2:
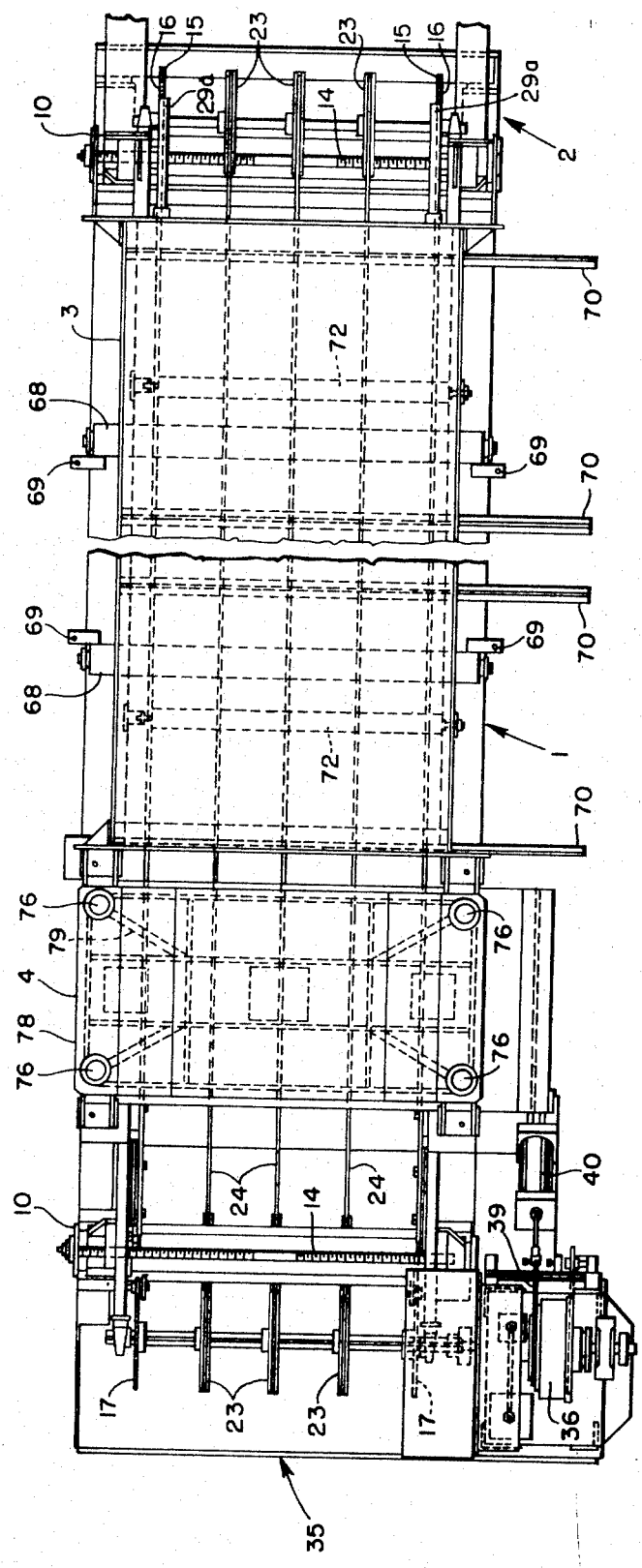
FIG. 2 is a top plan view of the FIG. 1 apparatus as viewed along the line 2—2, FIG. 1.

As shown, for example, in FIGS. 1 and 2, the thermoforming apparatus 1 herein comprises an indexing pin chain conveyor 2 which transports the plastic sheet S gripped thereby through a heating oven 3 and a thermoformer 4. As the plastic sheet S gripped by the conveyor 2 is indexed through the oven 3 it is progressively heated to forming temperature and when the heated sheet S reaches an indexed position between the separated top and bottom mold sections 5 and 6 of the thermoformer 4, the mold sections 5 and 6 are brought together to grip and seal against the sheet S whereupon the sheet S may be formed into the female cavities 7 in the top mold 5 by plug assist members 8 in the bottom mold 6, by air pressure in the bottom mold 6, and by vacuum in the top mold 5. After the sheet S has thus been formed, the molds 5 and 6 are separated and the sheet S is again indexed to bring the next heated section thereof between the separated molds 5 and 6 for repetition of the foregoing operation.

The Sheet Conveyor

Referring to FIGS. 1 to 5, the sheet conveyor 2 comprises a base including parallel bottom rails 9 and standards 10 adjacent each end, the latter having the slide members 11 of parallel top rails 12 laterally adjustable on said standards 10 as by rotary screw means 14 to accommodate different widths of plastic sheet S which it is desired to convey between the top rails 12.

The indexing conveyor 2 comprises a pair of pin chains 15 trained over sprocket wheels 16-17 on slide members 11 adjacent the ends of the top rails 12 and over sprocket wheels 18-19 disposed adjacent the ends of the base rails 9. The pin chains 15 have links provided with points 20 which, when engaged with the adjacent edges of the sheet S to be indexed through the apparatus 1, are effective to puncture the sheet S, thus to firmly grip the same for positive indexing movement through the oven 3 and through the thermoformer 4. As shown in FIG. 1, the chains 15 are maintained taut as by means of a spring-loaded idler sprocket wheel 21. The shafts for the respective pairs of sprocket wheels 16, 17, 18, and 19 may have adjustably mounted thereon sag band sheaves 23 over which are trained the bands 24 which support the plastic sheet S against sagging as it passes through the oven 3, spring loaded takeup sheaves 25 being provided to maintain the sag bands 24 taut.

Figure 4:
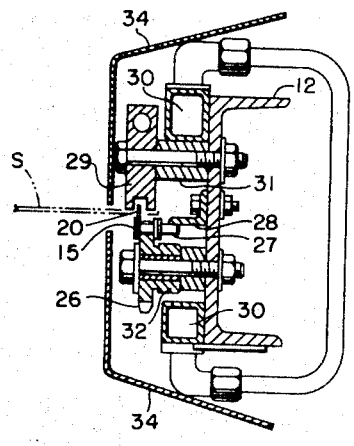
FIG. 4 is a cross-section view on enlarged scale taken substantially along the line 4—4, FIG. 1.
Figure 5:
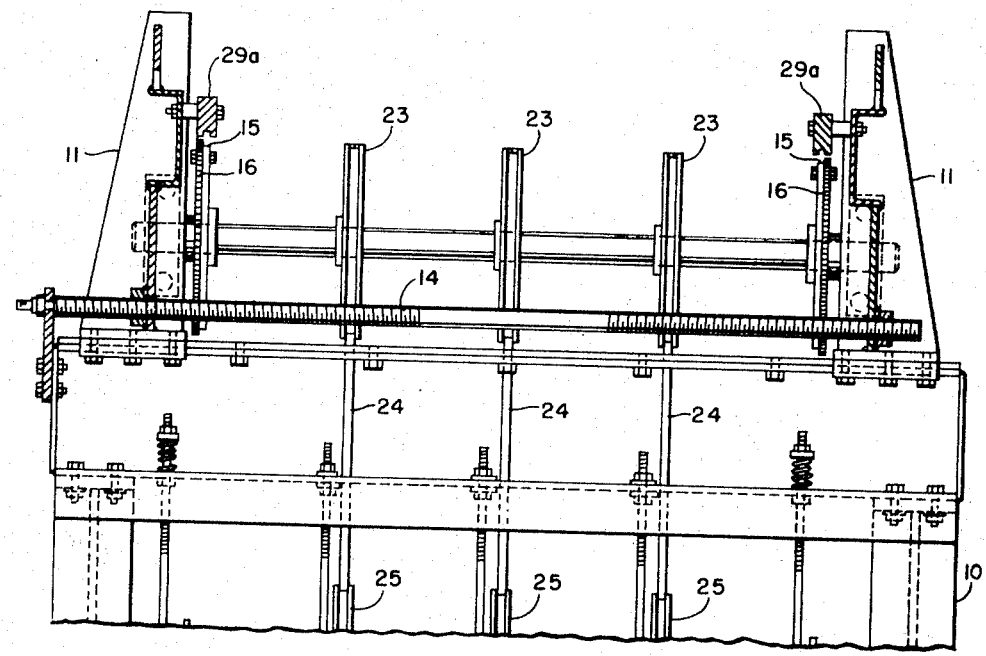
FIG. 5 is a fragmentary cross-section view on enlarged scale taken substantially along the line 5—5, FIG. 1.

As best shown in FIG. 4, each top rail 12 has secured thereto idler sprockets 26 at spaced intervals longitudinally therealong along which the respective pin chain 15 travels. Each chain 15 has projecting pin portions 27 engaged with an angle 28 secured to each rail 12, said pin portions 27 maintaining the pin axes parallel to the plane of the sheet S during puncturing of the sheet as the sheet enters the conveyor 2 and during the indexing of the chains 15 and sheet S through the apparatus. Located above the gripped edges of the sheet S are sheet and chain guide bars 29, as of extruded aluminum, which are hollow as shown for circulation of a suitable coolant medium, such as water, therethrough, thus to cool the sheet edges and the chains 15. Further coolant ducts 30 are provided for circulation of water therethrough to cool the respective rails 12, the guide bar bushings 31, and the idler sprocket bushings 32. In addition, heat shields 34 are provided above and below the gripped edges of the sheet S thus to prevent excessive heating of the edge portions of the sheet S. The guide bars 29A at the right in FIGS. 1 and 2 (also see FIG. 5) are solid steel bars and have cam surfaces 33 to guide the leading end of the sheet S.

The Conveyor Indexing Mechanism

Figure 3:
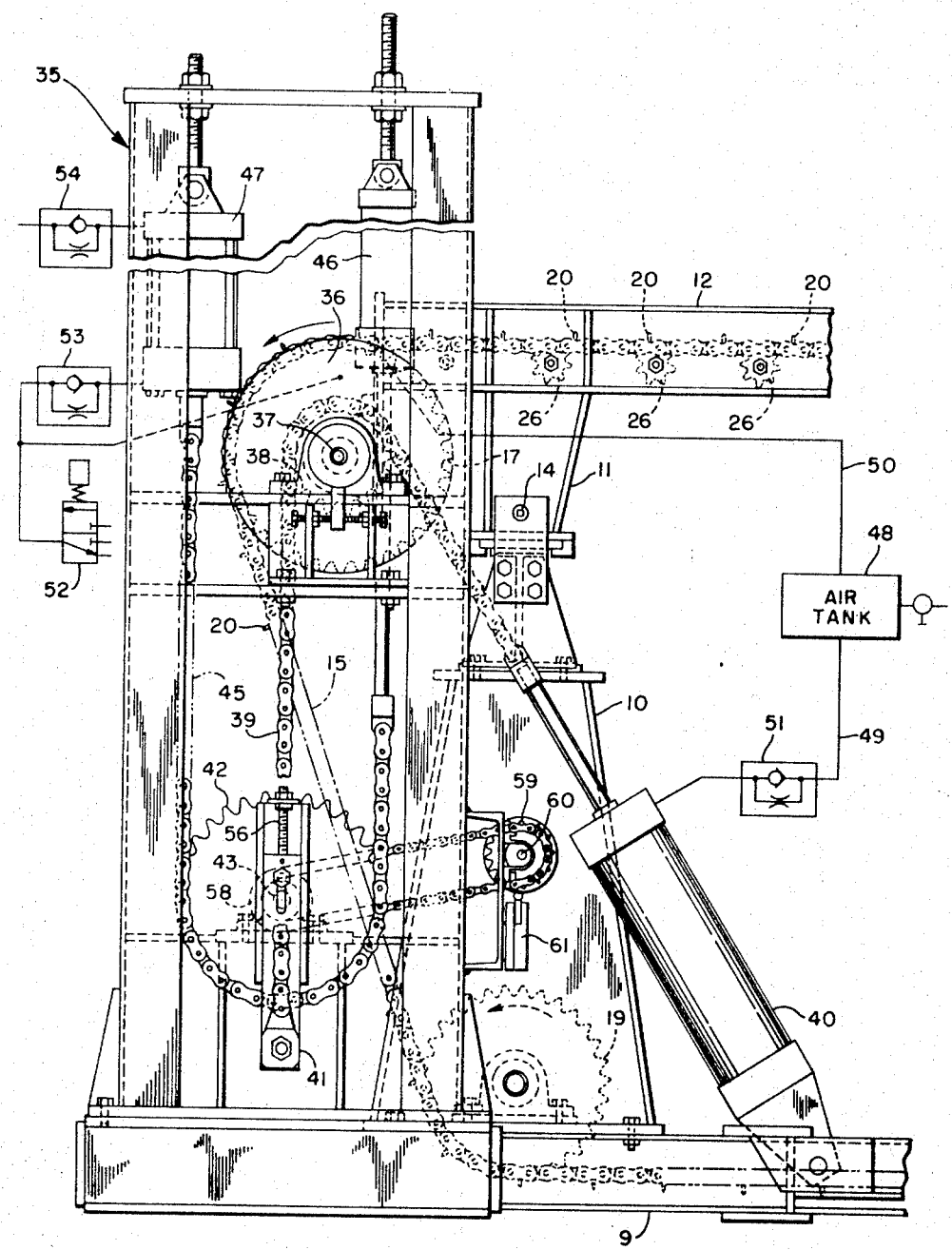
FIG. 3 is a side elevation view illustrating in detail the indexing drive mechanism.

As best shown in FIGS. 1, 2, and 3, the conveyor indexing mechanism 35 comprises a pneumatic clutch 36 on the sprocket shaft 37 for sprockets 17 at the left as shown in FIG. 1, and trained over a sprocket 38 which drives the shaft 37 when the clutch 36 is engaged and which moves freely in the opposite direction when the clutch 36 is disengaged, is a chain 39 having one end connected to a pneumatic cylinder or air spring 40 and the other end connected to an adjustable crank arm 41 on a sprocket 42 journaled on a jack shaft 43. Trained over said sprocket 42 is another length of chain 45, one end of which is connected to an air spring 46, and the other end of which is connected to an actuating cylinder 47 which has a stroke equal to one-half revolution of the sprocket 42. As clearly shown in FIG. 3 the rod ends of cylinders 40 and 46 are in constant communication with an air pressure tank 48 through conduits 49 and 50, conduit 49 having therein a choke-check valve 51, and the head ends of said cylinders 40 and 46 are vented to the atmosphere.

When the solenoid valve 52 (FIG. 3) is energized, air under pressure flows through said valve 52 to engage the clutch 36 and to enter the rod end of cylinder 47 via a choke-check valve 53 while the head end is vented through choke-check valve 54. As evident, when air under pressure is admitted into the lower rod end of the indexing cylinder 47, the crank sprocket 42 is turned 180° from its upper position to the lower FIGS. 1 and 3 position. Such 180° clockwise movement of the crank sprocket 42 turns the now engaged drive sprocket 38 in a counterclockwise direction through the chain 39, whereby the chains 15 and the sheet S gripped thereby are indexed a predetermined amount depending on the radius of the crank arm 41, the radius being adjustable as by means of the screw 56, as shown in FIG. 3.

It is to be noted that by reason of the 180° clockwise rotation of the crank sprocket 42, the turning of the drive sprocket 38 and shaft 37 will cause a sinusoidal speed curve of the chains 15 to produce a gradual acceleration and deceleration from one indexed position to the next. When the solenoid valve 52 is de-energized, the clutch 36 is disengaged, and the lower end of the indexing cylinder 47 is connected to the atmosphere through the choke check 53 and valve 52 whereby tank pressure in air springs 40 and 46 is effective to turn the released drive sprocket 38 in a clockwise direction for return of the crank arm 41 to its upper position, i.e., the position where the crank arm 41 is disposed 180° counterclockwise from the position shown in FIG. 3.

The crank sprocket shaft 43 may have thereon other sprockets 58 such as the one shown in FIG. 3, which drives sprockets 59 to actuate a cam shaft 60 to actuate suitable switches 61 to initiate closing operation of the thermoformer 4 after the heated sheet S from the oven 3 has been indexed to a position between the separated molds 5 and 6.

I, therefore, particularly point out and distinctly claim as my invention:

1. Thermoforming apparatus of the type wherein a conveyor is adapted to transport a plastic sheet in stepwise manner successively through a heating oven whereat the sheet is heated to forming temperature and through a thermoformer whereat the heated sheet is formed between complemental molds; the improvement which comprises a conveyor drive mechanism having a drive crank operatively connected to said conveyor and crank drive means to rotate said crank about 180° to move said conveyor with a sinusoidal speed curve having gradual acceleration from zero speed and gradual deceleration to zero speed in the stepwise transport of the sheet; a clutch between said crank and said conveyor; means selectively operative to engage and disengage said clutch; said clutch, when egaged, driving said conveyor during such 180° rotation of said crank and, when disengaged, permitting 180° reverse rotation of said crank while said conveyor is stationary; said drive means comprising a fluid pressure actuated cylinder having a first drive chain trained over a sprocket on said crank; and a second chain connected to said crank and trained over a sprocket on said conveyor to drive the latter when said clutch is engaged.

2. The apparatus of claim 1 wherein spring means connected to said first and second chains are operative to return said crank sprocket and conveyor sprocket upon venting of said cylinder and upon disengagement of said clutch.

3. A conveyor comprising a pair of endless elements adapted to engage the opposite edge portions of a plastic sheet to transport the sheet; a drive mechanism to move said elements longitudinally in stepwise manner; said mechanism comprising a crank operatively connected to said elements and crank drive means to rotate said crank about 180° to effect a sinusoidal speed curve with gradual acceleration from zero speed and gradual deceleration to zero speed of said elements and the sheet engaged thereby; a clutch between said crank and said elements, means selectively operative to engage and disengage said clutch; said clutch, when engaged, driving said elements during such 180° rotation of said crank and, when disengaged, permitting 180° reverse rotation of said crank while said elements are stationary; said drive means comprising a fluid pressure actuated cylinder having a first drive chain trained over a sprocket on said crank; and a second chain connected to said crank and trained over a sprocket for said elements to drive the latter when the clutch is engaged.

4. The conveyor of claim 3 wherein spring means connected to said first and second chains are operative to return said crank sprocket and conveyor element sprocket upon venting of said cylinder and upon disengagement of said clutch.

* * * * *